(12) United States Patent
Huang et al.

(10) Patent No.: US 9,749,841 B2
(45) Date of Patent: Aug. 29, 2017

(54) METHOD AND SYSTEM FOR UPDATING CLOSED SUBSCRIBER GROUP IDENTITY STATE, AND EVOLVED NODE B

(71) Applicant: ZTE Corporation, Shenzhen (CN)

(72) Inventors: Ying Huang, Shenzhen (CN); Yin Gao, Shenzhen (CN); Feng Xie, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/303,498

(22) PCT Filed: Jul. 23, 2014

(86) PCT No.: PCT/CN2014/082841
§ 371 (c)(1),
(2) Date: Oct. 11, 2016

(87) PCT Pub. No.: WO2015/154345
PCT Pub. Date: Oct. 15, 2015

(65) Prior Publication Data
US 2017/0041777 A1 Feb. 9, 2017

(30) Foreign Application Priority Data
Apr. 11, 2014 (CN) .......................... 2014 1 0153099

(51) Int. Cl.
*H04W 4/00* (2009.01)
*H04W 8/18* (2009.01)
(Continued)

(52) U.S. Cl.
CPC ............. *H04W 8/186* (2013.01); *H04W 8/08* (2013.01); *H04W 8/20* (2013.01); *H04W 48/02* (2013.01)

(58) Field of Classification Search
None
See application file for complete search history.

(56) References Cited

U.S. PATENT DOCUMENTS 8,737,302 B2 5/2014 Wang
2010/0238858 A1* 9/2010 Kim .................... H04W 4/08
370/328

(Continued)

FOREIGN PATENT DOCUMENTS

CN 101296451 A 10/2008
CN 102026333 A 4/2011
(Continued)

OTHER PUBLICATIONS

International Search Report in international application No. PCT/CN2014/082841, mailed on Jan. 9, 2015.
(Continued)

*Primary Examiner* — Idowu O Osifade
(74) *Attorney, Agent, or Firm* — Oppedahl Patent Law Firm LLC (57) ABSTRACT

Disclosed are a method and system for updating a Closed Subscriber Group (CSG) identity state, and an evolved Node B (eNB). An eNB obtains updated CSG identity state information about a User Equipment (UE) from a Mobility Management Entity (MME), and executes an update operation according to the updated CSG identity state information, the eNB being a Master eNB (MeNB) or a Secondary eNB (SeNB).

16 Claims, 7 Drawing Sheets

(51) Int. Cl.
H04W 48/02 (2009.01)
H04W 8/08 (2009.01)
H04W 8/20 (2009.01)

(56) References Cited

U.S. PATENT DOCUMENTS

2012/0201206 A1    8/2012  Wang
2013/0260768 A1   10/2013  Guo et al.
2015/0245402 A1*   8/2015  Mochizuki ............ H04W 36/22
                                                370/331

FOREIGN PATENT DOCUMENTS

CN    102026334 A    4/2011
EP      2482574 A1   8/2012
EP      2552155 A1   1/2013

OTHER PUBLICATIONS

English Translation of the Written Opinion of the International Search Authority in international application No. PCT/CN2014/082841, mailed on Jan. 9, 2015.
Supplementary European Search Report in European application No. 14889151.8, mailed on Jan. 20, 2017.
3gpp: "3rd Generation Partnership Project; Technical Specification Group Services and System Aspects; General Packet Radio Service (GPRS) enhancements for Evolved Universal Terrestrial Radio Access Network (E-UTRAN) access (Release 12)", Dec. 13, 2013 (Dec. 13, 2013), XP055191334, Retrieved from the Internet: URL:http://www.3gpp.org/ftp/specs/archive/ 23_series/ 23.401/ [retrieved on May 22, 2015], mailed on Dec. 13, 2013.

* cited by examiner

101. An MeNB obtains updated CSG identity state information about a UE

102. The MeNB executes an update operation according to the updated CSG identity state information

METHOD AND SYSTEM FOR UPDATING CLOSED SUBSCRIBER GROUP IDENTITY STATE, AND EVOLVED NODE B

TECHNICAL FIELD

The present disclosure relates to a wireless communication technology and in particular to a method and system for updating a Closed Subscriber Group (CSG) identity state, and an evolved Node B (eNB).

BACKGROUND

Figure 1:
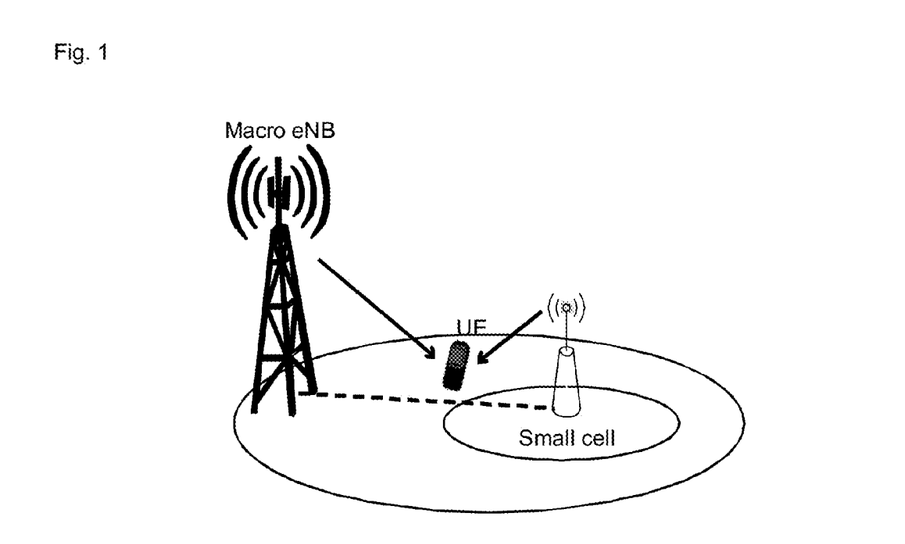
FIG. 1 is a diagram illustrating a wireless communication system architecture into which a small cell is introduced in the prior art.

With the development of wireless multimedia services, high data rate and user experience are increasingly demanded by people, thereby making higher requirements on the system capacity and coverage of a traditional cellular network. In a traditional Long Term Evolution (LTE) cellular network, a macro eNB, serving as a unique access side network element, provides access service for a User Equipment (UE). In order to meet demands of a user for higher data rate and to improve the spectral efficiency of the cellular network, a $3^{rd}$ Generation Partnership Project (3GPP) introduces a Low Power Node (LPN), serving as a supplement of the macro eNB, to provide access service for the UE. The LPN has the characteristics of low cost, low power, convenient deployment or the like, and usually has two deployment scenarios, namely a hot-spot deployment scenario and a coverage enhancement scenario, thereby effectively increasing the data rate of a high-rate data service in an indoor or outdoor hot-spot area, and improving the coverage of a remote area or a cell edge. Usually, the LPN may also be called as a small eNB, including a Home eNB (HeNB), a pico, a Remote Radio Unit/Remote Radio Head (RRU/RRH), a Relay Node (RN) or the like. Under the hot-spot deployment scenario, in order to achieve higher data rate and spectral efficiency, it is necessary to densely deploy a great number of small eNBs in an area. However, as the coverage range of a small cell under a small eNB is smaller, the probability of switching failure caused when a UE moving at an intermediate-high speed passes through the small eNB is increased, and the continuity of service for the UE is influenced. In order to improve the movement performance of the UE introduced into the small cell, it is proposed, in the industry, that a certain eNB such as the macro eNB ensures basic coverage. As shown in FIG. 1, the UE is always kept in Radio Resource Control (RRC) connection with the eNB, and the small cell only serves as a Transmission Point (TP) so as to provide a higher data rate and meet power saving demands from a user. Under this system architecture, the UE is at least kept in connection with two eNBs, and uses radio resources under the two eNBs, and cross-node radio resource aggregation may be achieved. This architecture is usually called as a dual-connection architecture. In the two eNBs connected with the UE, an eNB having a certain management control capacity is usually called as a Master eNB (MeNB), and the other eNB is called as a Secondary eNB (SeNB). When the UE has access to the MeNB, dual connection may be achieved by means of an SeNB addition flow. After the SeNB is added successfully, the SeNB may be subjected to a series of management such as SeNB modification, SeNB deletion and SeNB change.

Figure 2:
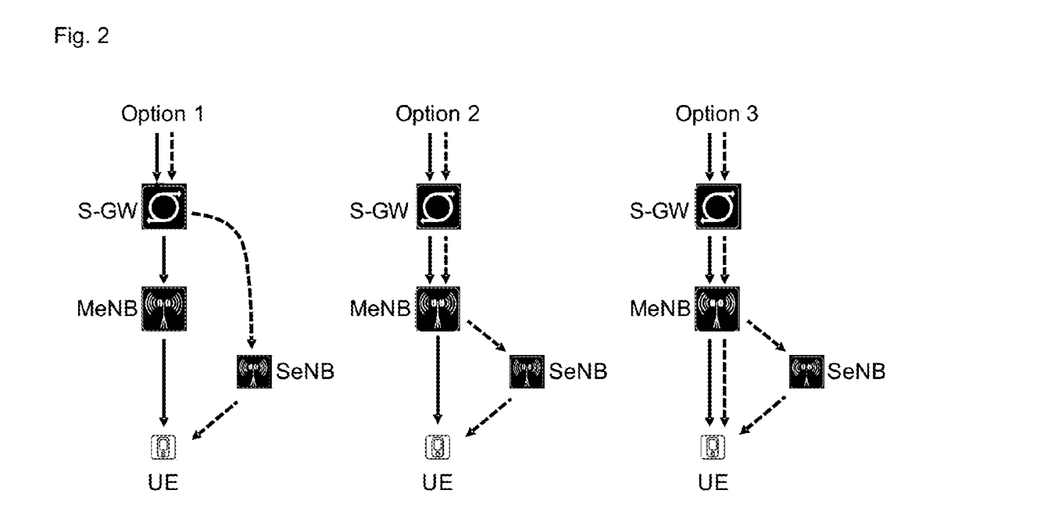
FIG. 2 is an architecture diagram illustrating a user plane under a dual-connection architecture in the prior art.
Figure 3:
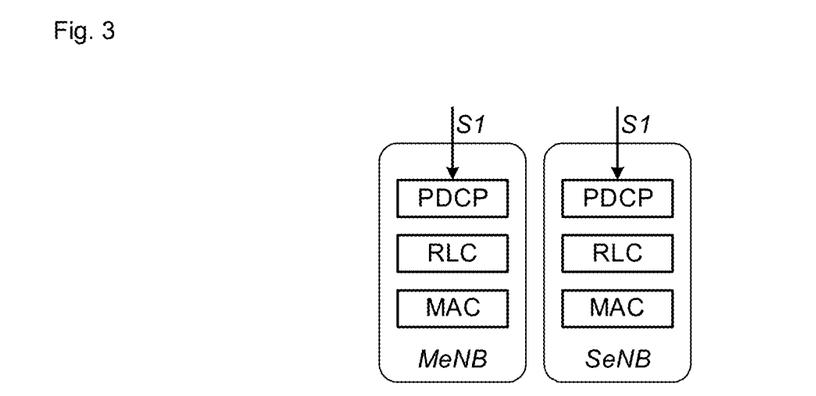
FIG. 3 is a diagram illustrating an eNB protocol stack adopting an architecture 1A of an architecture option 1 in the prior art.
Figure 4:
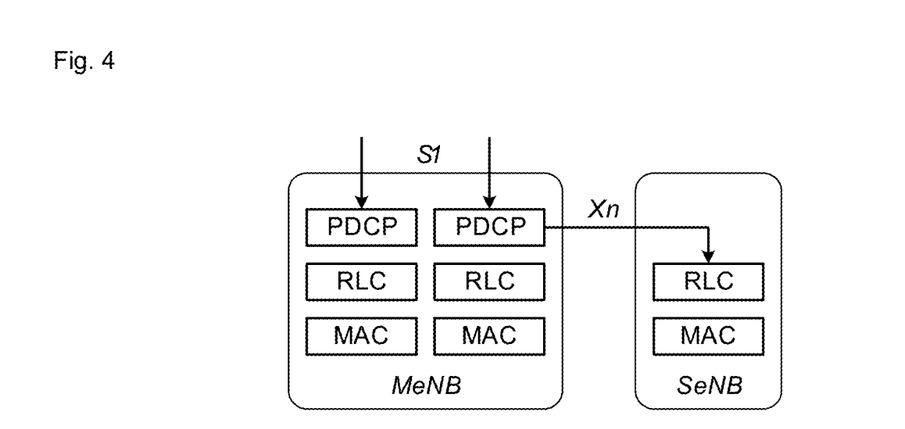
FIG. 4 is a diagram illustrating an eNB protocol stack adopting an architecture 3C of an architecture option 3 in the prior art.

A user plane has three possible architectures under the dual-connection architecture. As shown in FIG. 2, in an architecture option 1, an S1-U terminates at an MeNB and an SeNB; in an architecture option 2, the S1-U terminates at the MeNB, and no bearer separation exists at a Radio Access Network (RAN) side; and in an architecture option 3, the S1-U terminates at the MeNB, and bearer separation exists at the RAN side. For instance, after downlink data in an EPS bearer reaches the MeNB, some data in a bearer may be separated to the SeNB, and then is sent to the UE by the SeNB. According to a user plane protocol stack architecture of the SeNB, the above three architectures may be further subdivided. At present, dual connection may adopt an architecture 1A in the architecture option 1 or an architecture 3C in the architecture option 3. The architecture 1A is shown in FIG. 3. That is, the architecture option 1 is adopted, and a user plane protocol stack on the SeNB has an independent Packet Data Convergence Protocol (PDCP) layer and the following protocol layers including: a Radio Link Control (RLC) layer and a Media Access Control (MAC) layer, without bearer separation. The architecture 3C is shown in FIG. 4. That is, the architecture option 3 is adopted, and the user plane protocol stack on the SeNB has an independent RLC layer and the following protocol layer namely an MAC layer.

On the other hand, under the dual-connection architecture, an HeNB is probably used as the MeNB or the SeNB. Because the HeNB provides a service demand for only a specific user, a CSG concept is introduced, a unique identifier of each CSG being CSG ID. In LTE, the HeNB is defined with three cells having different access modes, namely a CSG cell (corresponding to a closed-mode HeNB, wherein only a UE registered as a CSG member can have access to it), a hybrid cell (corresponding to a hybrid-mode HeNB, wherein any terminal can have access to it, but a UE registered as a CSG member can have access to it with a higher-priority membership), and an open cell (corresponding to an open-mode HeNB, wherein any UE can have access to it). The access mode of the HeNB and the CSG ID may be obtained by broadcasting via an air interface. If the HeNB does not broadcast the CSG ID and a CSG indication, the cell refers to the open cell; if the HeNB broadcasts the CSG ID and a CSG indication of which the value is 'true', the cell refers to the CSG cell; and if the HeNB broadcasts the CSG ID and a CSG indication of which the value is 'false', the cell refers to the hybrid cell. A network element of a core network and a UE store CSG subscription information about a user, including a CSG ID list to which the user can have access as a membership. Under the dual-connection architecture, if the CSG subscription information about the user changes or expires, it is necessary to inform a corresponding MeNB or SeNB of an updated CSG identity state and to execute corresponding subsequent operations. For instance, if the identity of the UE in the closed cell is changed from a member to a non-member, the UE is no longer allowed to have access to the cell, and if the identity of the UE in the hybrid cell is changed from a member to a non-member, the Qos grade of the UE in the cell is reduced.

SUMMARY

In order to solve the existing technical problems, the embodiments of the present disclosure mainly provide a method and system for updating a CSG identity state, and an eNB.

The technical solutions of the embodiments of the present disclosure are implemented as follows.

A method for updating a CSG identity state provided by an embodiment of the present disclosure includes that:

an eNB obtains updated CSG identity state information about a UE, and executes an update operation according to the updated CSG identity state information, the eNB being an MeNB or an SeNB.

A method for updating a CSG identity state provided by an embodiment of the present disclosure includes that:

a Mobility Management Entity (MME) sends updated CSG identity state information about a UE to an eNB, the eNB being an MeNB or an SeNB; and the eNB obtains the updated CSG identity state information about the UE, and executes an update operation according to the updated CSG identity state information.

An eNB provided by an embodiment of the present disclosure is an MeNB or an SeNB, and includes an acquisition module and an update module, wherein the acquisition module is configured to obtain updated CSG identity state information about a UE; and the update module is configured to execute an update operation according to the updated CSG identity state information.

A system for updating a CSG identity state provided by an embodiment of the present disclosure includes an eNB and an MME, wherein the eNB is an MeNB or an SeNB;

the MME is configured to send updated CSG identity state information about a UE to the eNB; and the eNB is configured to obtain the updated CSG identity state information about the UE, and execute an update operation according to the updated CSG identity state information.

The embodiments of the present disclosure provide a method and system for updating a CSG identity state, and an eNB. An eNB obtains updated CSG identity state information about a UE from an MME and executes an update operation according to the updated CSG identity state information. Thus, update of a CSG identity state of a UE is informed in time of a corresponding eNB, and the eNB or MME may correctly execute subsequent operations under a dual-connection architecture.

DETAILED DESCRIPTION

In the embodiments of the present disclosure, an eNB obtains updated CSG identity state information about a UE from an MME, and executes an update operation according to the updated CSG identity state information, the eNB being an MeNB or an SeNB.

The present disclosure will be further illustrated below with reference to the drawings and specific embodiments in detail.

Figure 5:
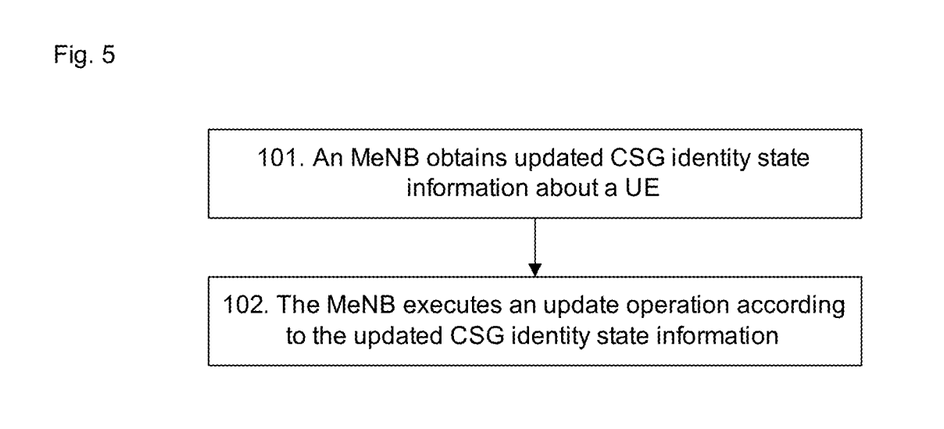
FIG. 5 is a flowchart showing a method for updating a CSG identity state at an MeNB according to an embodiment of the present disclosure.

An embodiment of the present disclosure provides a method for updating a CSG identity state at an MeNB. As shown in FIG. 5, the method includes the steps as follows.

Step 101: An MeNB obtains updated CSG identity state information about a UE.

Specifically, the MeNB obtains the updated CSG identity state information about the UE by means of a UE initial context establishment request message and/or a UE context modification request message. Here, the CSG identity state information generally includes: a CSG identity state and/or a corresponding CSG ID.

Step 102: The MeNB executes an update operation according to the updated CSG identity state information.

The step may specifically include that:

the MeNB initiates an SeNB modification flow according to the updated CSG identity state information;

or, the MeNB initiates an SeNB release flow according to the updated CSG identity state information;

or, the MeNB initiates a cell switching flow according to the updated CSG identity state information;

or, the MeNB initiates an S1 release flow according to the updated CSG identity state information;

or, the MeNB initiates an SeNB release and cell switching flow according to the updated CSG identity state information;

or, the MeNB initiates an SeNB release and S1 release flow according to the updated CSG identity state information.

In addition, in order to make an SeNB also obtain the updated CSG identity state information about the UE, the step further includes that:

the MeNB sends the updated CSG identity state information or CSG identity state update indication information to the SeNB.

Specifically, the MeNB may send the updated CSG identity state information or the CSG identity state update indication information by means of the SeNB modification flow or the SeNB release flow.

In Step 102, the MeNB may also send S1 release assistance information to the MME, the S1 release assistance information at least including one of:

identification information about an eNB corresponding to updated CSG identity state information;

indication information indicating that an eNB corresponding to the updated CSG identity state information is an MeNB or an SeNB;

indication information indicating that it is unnecessary to perform S1 release;

indication information indicating that it is unnecessary to perform S1 release check; and dual-connection indication information.

Here, the MeNB may send the S1 release assistance information to the MME by means of an S1 interface message, wherein the S1 interface message may be:

a UE context modification response message;

or, an Evolved Radio Access Bearer (E-RAB) modification indication message;

or, a path transfer request message;

or, an additional S1 interface message.

The method for updating a CSG identity state according to the above embodiment mainly provides specific operations of the MeNB.

Figure 6:
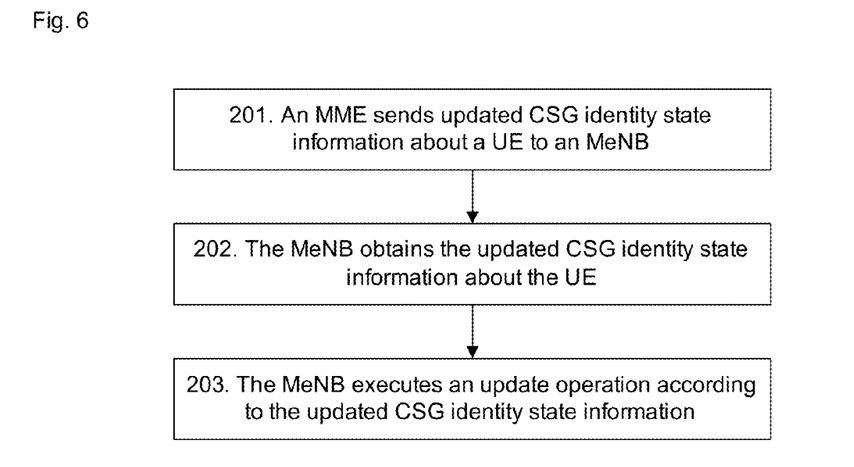
FIG. 6 is a flowchart showing a method for updating a CSG identity state by means of interaction between an MeNB and an MME according to an embodiment of the present disclosure.

Based on the operations of the MeNB in the above embodiment, an embodiment of the present disclosure also provides a method for updating a CSG identity state by means of interaction between an MeNB and an MME. As shown in FIG. 6, the method includes the steps as follows.

Step 201: An MME sends updated CSG identity state information about a UE to an MeNB.

Specifically, the MME sends a UE initial context establishment request message and/or a UE context modification request message to the MeNB, the UE initial context establishment request message and/or the UE context modification request message including the updated CSG identity state information about the UE.

Step 202: The MeNB obtains the updated CSG identity state information about the UE.

Specifically, the MeNB obtains the updated CSG identity state information about the UE by means of the UE initial context establishment request message and/or the UE context modification request message sent by the MME. Here, the CSG identity state information generally includes: a CSG identity state and/or a corresponding CSG ID.

Step 203: The MeNB executes an update operation according to the updated CSG identity state information.

The step may specifically include that:

the MeNB initiates an SeNB modification flow according to the updated CSG identity state information;

or, the MeNB initiates an SeNB release flow according to the updated CSG identity state information;

or, the MeNB initiates a cell switching flow according to the updated CSG identity state information;

or, the MeNB initiates an S1 release flow according to the updated CSG identity state information;

or, the MeNB initiates an SeNB release and cell switching flow according to the updated CSG identity state information;

or, the MeNB initiates an SeNB release and S1 release flow according to the updated CSG identity state information.

In addition, in order to make an SeNB also obtain the updated CSG identity state information about the UE, the step further includes that:

the MeNB sends the updated CSG identity state information or CSG identity state update indication information to the SeNB.

Specifically, the MeNB may send the updated CSG identity state information or the CSG identity state update indication information by means of the SeNB modification flow or the SeNB release flow.

In Step 203, the MeNB may also send S1 release assistance information to the MME, the S1 release assistance information at least including one of:

identification information about an eNB corresponding to updated CSG identity state information;

indication information indicating that an eNB corresponding to the updated CSG identity state information is an MeNB or an SeNB;

indication information indicating that it is unnecessary to perform S1 release;

indication information indicating that it is unnecessary to perform S1 release check; and dual-connection indication information.

Here, the MeNB may send the S1 release assistance information to the MME by means of an S1 interface message, wherein the S1 interface message may be:

a UE context modification response message;

or, an E-RAB modification indication message;

or, a path transfer request message;

or, an additional S1 interface message.

In the solution of the embodiment, after the MME sends the updated CSG identity state information about the UE to the MeNB, the method further includes that:

the MME determines whether to initiate the S1 release flow according to the updated CSG identity state of the UE and the S1 release assistance information; or, the MME determines whether to initiate the S1 release flow according to the updated CSG identity state of the UE.

Figure 7:
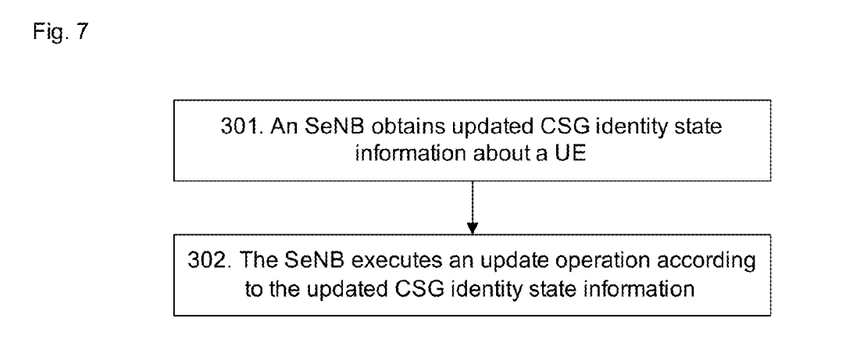
FIG. 7 is a flowchart showing a method for updating a CSG identity state at an SeNB according to an embodiment of the present disclosure.

An embodiment of the present disclosure also provides a method for updating a CSG identity state at an SeNB. As shown in FIG. 7, the method includes the steps as follows.

Step 301: An SeNB obtains updated CSG identity state information about a UE.

Specifically, the SeNB obtains the updated CSG identity state information about the UE by means of a UE initial context establishment request message and/or a UE context modification request message, wherein the CSG identity state information generally includes: a CSG identity state and/or a corresponding CSG ID.

Step 302: The SeNB executes an update operation according to the updated CSG identity state information.

Specifically, the SeNB initiates an SeNB modification flow according to the updated CSG identity state information; or, the SeNB initiates an SeNB release flow according to the updated CSG identity state information.

In addition, in order to make an MeNB also obtain the updated CSG identity state information about the UE, the step further includes that:

the SeNB sends the updated CSG identity state information or CSG identity state update indication information to the MeNB.

Specifically, the SeNB sends the updated CSG identity state information or the CSG identity state update indication information to the MeNB by means of the SeNB modification flow or the SeNB release flow.

Figure 8:
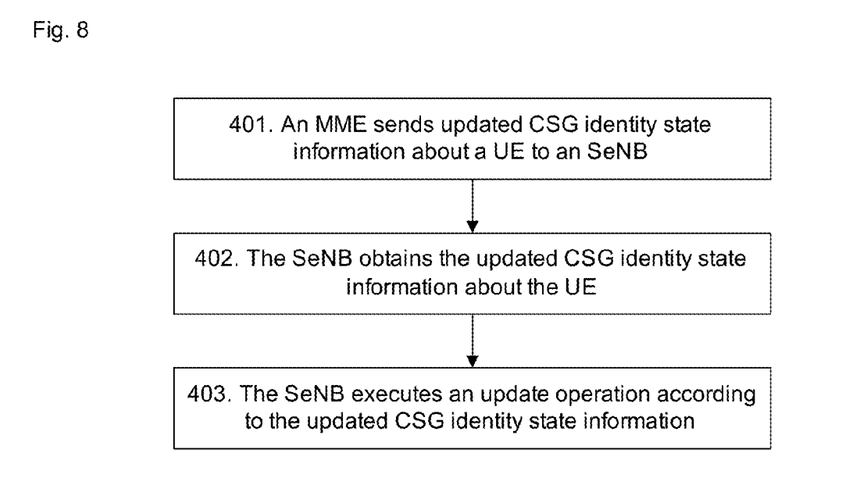
FIG. 8 is a flowchart showing a method for updating a CSG identity state by means of interaction between an SeNB and an MME according to an embodiment of the present disclosure.

Based on operations of the SeNB in the above embodiment, an embodiment of the present disclosure also provides a method for updating a CSG identity state by means of interaction between an SeNB and an MME. As shown in FIG. 8, the method includes the steps as follows.

Step 401: An MME sends updated CSG identity state information about a UE to an SeNB.

Specifically, the MME sends a UE initial context establishment request message and/or a UE context modification request message to the SeNB, the UE initial context establishment request message and/or the UE context modification request message including the updated CSG identity state information about the UE.

Step 402: The SeNB obtains the updated CSG identity state information about the UE.

Specifically, the SeNB obtains the updated CSG identity state information about the UE by means of the UE initial context establishment request message and/or the UE context modification request message sent by the MME, wherein the CSG identity state information generally includes: a CSG identity state and/or a corresponding CSG ID.

Step 403: The SeNB executes an update operation according to the updated CSG identity state information.

Specifically, the SeNB initiates an SeNB modification flow according to the updated CSG identity state information; or, the SeNB initiates an SeNB release flow according to the updated CSG identity state information.

In addition, in order to make an MeNB also obtain the updated CSG identity state information about the UE, the step further includes that:

the SeNB sends the updated CSG identity state information or CSG identity state update indication information to the MeNB.

Specifically, the SeNB sends the updated CSG identity state information or the CSG identity state update indication information to the MeNB by means of the SeNB modification flow or the SeNB release flow.

Figure 9:
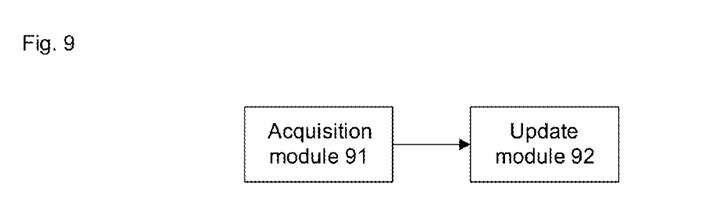
FIG. 9 is a structural diagram illustrating an eNB according to an embodiment of the present disclosure.

Based on the above embodiment providing the method for updating a CSG identity state at an MeNB, an embodiment of the present disclosure provides an eNB. As shown in FIG. 9, the eNB includes: an acquisition module 91 and an update module 92.

The acquisition module 91 may be implemented by an S1 interface of the eNB, and is configured to obtain updated CSG identity state information about a UE.

Specifically, the acquisition module 91 obtains the updated CSG identity state information about the UE by means of a UE initial context establishment request message and/or a UE context modification request message. Here, the CSG identity state information generally includes: a CSG identity state and/or a corresponding CSG ID.

The update module 92 may be implemented by a memory of the eNB, and is configured to execute an update operation according to the updated CSG identity state information.

Specifically, when the eNB is an MeNB, the update module 92 initiates an SeNB modification flow according to the updated CSG identity state information; or, the update module 92 initiates an SeNB release flow according to the updated CSG identity state information; or, the update module 92 initiates a cell switching flow according to the updated CSG identity state information; or, the update module 92 initiates an S1 release flow according to the updated CSG identity state information; or, the update module 92 initiates an SeNB release and cell switching flow according to the updated CSG identity state information; or, the update module 92 initiates an SeNB release and S1 release flow according to the updated CSG identity state information.

When the eNB is an SeNB, the update module 92 initiates an SeNB modification flow according to the updated CSG identity state information; or, the update module 92 initiates an SeNB release flow according to the updated CSG identity state information.

In addition, when the eNB is the MeNB, in order to make the SeNB also obtain the updated CSG identity state information about the UE, the update module 92 is further configured to send the updated CSG identity state information or CSG identity state update indication information to the SeNB.

Specifically, the update module 92 may send the updated CSG identity state information or the CSG identity state update indication information by means of the SeNB modification flow or the SeNB release flow.

Similarly, when the eNB is the SeNB, in order to make the MeNB also obtain the updated CSG identity state information about the UE, the update module 92 is further configured to send the updated CSG identity state information or CSG identity state update indication information to the MeNB.

Specifically, the update module 92 sends the updated CSG identity state information or the CSG identity state update indication information to the MeNB by means of the SeNB modification flow or the SeNB release flow.

In one embodiment, when the eNB is the MeNB, the update module 92 may also send S1 release assistance information to an MME, the S1 release assistance information at least including one of:

identification information about an eNB corresponding to updated CSG identity state information;

indication information indicating that an eNB corresponding to the updated CSG identity state information is an MeNB or an SeNB;

indication information indicating that it is unnecessary to perform S1 release;

indication information indicating that it is unnecessary to perform S1 release check; and dual-connection indication information.

Here, the update module 92 may send the S1 release assistance information to the MME by means of an S1 interface message, wherein the S1 interface message may be:

a UE context modification response message;

or, an E-RAB modification indication message;

or, a path transfer request message;

or, an additional S1 interface message.

Figure 10:
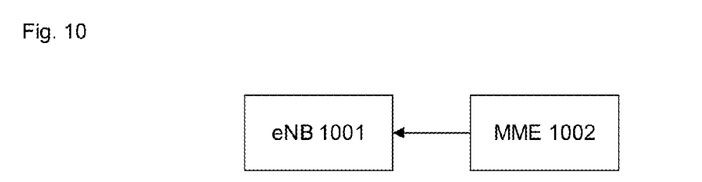
FIG. 10 is a structural diagram illustrating a system for updating a CSG identity state according to an embodiment of the present disclosure.

Based on the above eNB, an embodiment of the present disclosure also provides a system for updating a CSG identity state. As shown in FIG. 10, the system includes an eNB 1001 and an MME 1002.

The MME 1002 is configured to send updated CSG identity state information about a UE to the eNB 1001.

Specifically, the MME 1002 sends a UE initial context establishment request message and/or a UE context modification request message to the eNB 1001, the UE initial context establishment request message and/or the UE context modification request message including the updated CSG identity state information about the UE.

The eNB 1001 is configured to obtain the updated CSG identity state information about the UE, and execute an update operation according to the updated CSG identity state information.

Specifically, the eNB 1001 obtains the updated CSG identity state information about the UE by means of the UE initial context establishment request message and/or the UE context modification request message sent by the MME

1002. Here, the CSG identity state information generally includes a CSG identity state and/or a corresponding CSG ID.

When the eNB 1001 is an MeNB, the MeNB is specifically configured to:

initiate an SeNB modification flow according to the updated CSG identity state information;

or, initiate an SeNB release flow according to the updated CSG identity state information;

or, initiate a cell switching flow according to the updated CSG identity state information;

or, initiate an S1 release flow according to the updated CSG identity state information;

or, initiate an SeNB release and cell switching flow according to the updated CSG identity state information;

or, initiate an SeNB release and S1 release flow according to the updated CSG identity state information.

When the eNB 1001 is an SeNB, the SeNB is specifically configured to: initiate an SeNB modification flow according to the updated CSG identity state information; or, initiate an SeNB release flow according to the updated CSG identity state information.

In addition, when the eNB 1001 is the MeNB, in order to make the SeNB also obtain the updated CSG identity state information about the UE, the MeNB is further configured to send the updated CSG identity state information or CSG identity state update indication information to the SeNB.

Specifically, the MeNB may send the updated CSG identity state information or the CSG identity state update indication information by means of the SeNB modification flow or the SeNB release flow.

Similarly, when the eNB 1001 is the SeNB, in order to make the MeNB also obtain the updated CSG identity state information about the UE, the SeNB also sends the updated CSG identity state information or CSG identity state update indication information to the MeNB.

Specifically, the SeNB sends the updated CSG identity state information or the CSG identity state update indication information to the MeNB by means of the SeNB modification flow or the SeNB release flow.

In one embodiment, when the eNB 1001 is the MeNB, the MeNB may also send S1 release assistance information to the MME 1002, the S1 release assistance information at least including one of:

identification information about an eNB corresponding to updated CSG identity state information;

indication information indicating that an eNB corresponding to updated CSG identity state information is an MeNB or an SeNB;

indication information indicating that it is unnecessary to perform S1 release;

indication information indicating that it is unnecessary to perform S1 release check; and dual-connection indication information.

Here, the MeNB may send the S1 release assistance information to the MME 1002 by means of an S1 interface message, wherein the S1 interface message may be:

a UE context modification response message;

or, an E-RAB modification indication message;

or, a path transfer request message;

or, an additional S1 interface message.

In the solution of the embodiment, after the MME 1002 sends the updated CSG identity state information about the UE to the eNB 1001, the MME 1002 is further configured to:

determine whether to initiate the S1 release flow according to the updated CSG identity state of the UE and the S1 release assistance information; or, determine whether to initiate the S1 release flow according to the updated CSG identity state of the UE.

The implementation of the technical solutions of the present disclosure will be illustrated below with reference to embodiments in different scenarios in detail.

It is noted that the following method embodiments are applicable to a dual-connection user plane architecture 1A or 3C. An HeNB serving as an MeNB or an SeNB may be connected to an MME via an HeNB GW, so that an S1 message interacted between the MME and the MeNB/SeNB is forwarded by the HeNB GW. The HeNB serving as the MeNB or the SeNB may be connected to other eNBs via an X2 GW, so that an X2 message interacted between the MeNB/SeNB and the other eNBs and an X2 message interacted between the MeNB and the SeNB may be forwarded by the X2 GW.

Embodiment 1

Figure 11:
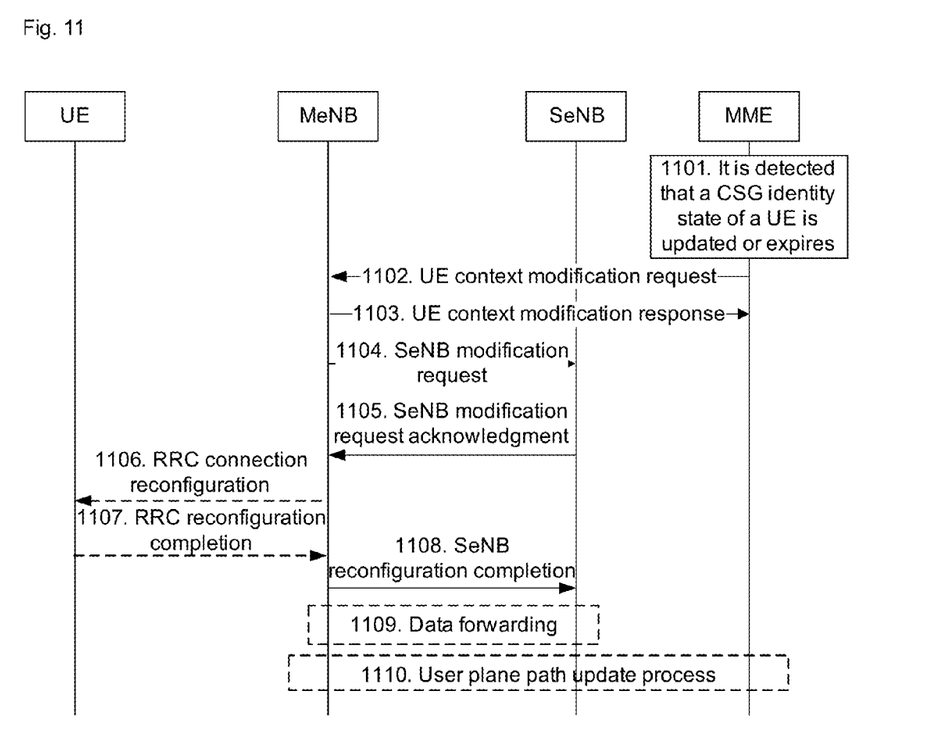
FIG. 11 is a flowchart showing a method for updating a CSG identity state according to an embodiment 1 of the present disclosure.

The embodiment describes a method for informing an MeNB by an MME after a CSG identity state of a UE in a hybrid cell of an SeNB is changed. FIG. 11 is a flowchart showing the method according to the embodiment. As shown in FIG. 11, the method of the embodiment includes the steps as follows.

Step 1101: An MME detects that a CSG identity state of a UE in a hybrid cell is changed, for instance, from a member/non-member to a non-member/member, or detects that a membership of the UE expires.

Step 1102: The MME sends a UE context modification request message, containing updated CSG identity state information about the UE, to an MeNB. Optionally, the message further contains a CSG ID corresponding to the updated CSG identity state information about the UE.

Step 1103: The MeNB sends a UE context modification response message to the MME.

Step 1104: If the MeNB determines (according to, for instance, the CSG ID contained in the UE context modification request message) that the identity state of the UE in the hybrid cell of an SeNB is changed, an SeNB modification request message is sent to the SeNB.

Generally, the SeNB modification request message contains the updated CSG identity state information about the UE or indication information (such as a reason value) for indicating update of the CSG identity state.

In addition, the SeNB modification request message may be further configured to request the SeNB to establish or release bearers of the UE. For instance, if the identity of the UE in an SeNB cell is changed from a member to a non-member or the membership of the UE expires, the MeNB may request the SeNB to release some bearers of the UE at the SeNB via the message. In this case, the SeNB modification request message may further contain GTP-U information for data forwarding between the SeNB and the MeNB. When the identity of the UE in the SeNB cell is changed from a non-member to a member, the MeNB may request the SeNB to establish bearers via the SeNB modification request message, and thus some bearers of the UE at the MeNB are distributed to the SeNB. Optionally, the SeNB modification request message may further contain QoS related parameters, such as a UE-AMBR value, adjusted by the MeNB according to the updated CSG identity state information about the UE. Here, Step 1104 may be performed before or after Step 1103.

Step 1105: The SeNB returns an SeNB modification request acknowledgment message to the MeNB.

In the step, when the SeNB modification request message contains the updated CSG identity state information about the UE, the SeNB updates the identity state of the UE, and correspondingly adjusts the QoS level of the UE. Optionally, the SeNB modification request acknowledgment message may contain QoS related parameters, such as a UE-AMBR value, adjusted by the SeNB according to the updated CSG identity state of the UE. If the MeNB requests the SeNB to establish bearers, the SeNB also needs to execute corresponding receiving control, reserves and configures radio resources for the recently established bearers, and sends radio resource configuration information to the MeNB via the SeNB modification request acknowledgment message. In the case of bearer establishment, the SeNB modification request acknowledgment message may further contain GTP-U information for data forwarding between the SeNB and the MeNB.

Step 1106: If change of UE air interface configuration information is involved, the MeNB sends an RRC connection reconfiguration message to the UE, indicating the UE to reconfigure an air interface.

Step 1107: After completing air interface reconfiguration, the UE returns an RRC reconfiguration completion message to the MeNB.

Step 1108: The MeNB sends an SeNB reconfiguration completion message to the SeNB so as to indicate that a new radio air interface is successfully configured.

Step 1109: If a new bearer is established or released on the SeNB, a corresponding data forwarding process may be executed between the MeNB and the SeNB.

Step 1110: If a new bearer is established or released on the SeNB and a dual-connection user plane architecture 1A is adopted, the MeNB initiates a user plane path update process to the MME, so as to update S1-U user plane paths of some bearers on a Serving Gateway (SGW).

Embodiment 2

Figure 12:
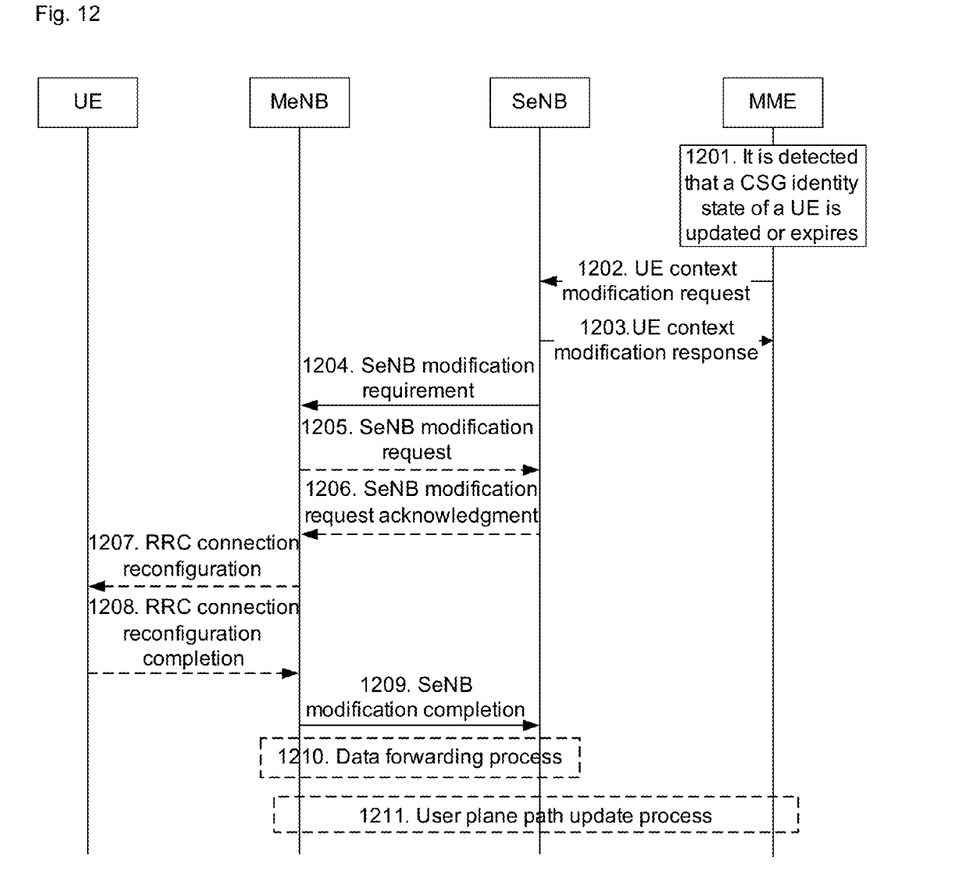
FIG. 12 is a flowchart showing a method for updating a CSG identity state according to an embodiment 2 of the present disclosure.

The embodiment describes a method for informing an SeNB by an MME after a CSG identity state of a UE in a hybrid cell of an SeNB is changed. FIG. 12 is a flowchart showing the method according to the embodiment. As shown in FIG. 12, the method of the embodiment includes the steps as follows.

Step 1201: An MME detects that a CSG identity state of a UE in a hybrid cell is changed, for instance, from a member/non-member to a non-member/member, or detects that a membership of the UE expires.

Step 1202: Under the condition that both the MME and an MeNB/SeNB have UE related S1 connection, when determining that the change of the CSG identity state corresponds to the SeNB, the MME sends a UE context modification request message, containing updated CSG identity state of the UE, to the SeNB.

The MME determines that the change of the CSG identity state corresponds to the SeNB. For instance, a relationship between a CSG ID and an eNB ID is maintained at the MME, and the MME determines that the change of the CSG identity state corresponds to the SeNB according to the relationship; or, the MME obtains a relationship between the eNB ID and the MeNB/SeNB and determines that the change of the CSG identity state corresponds to the SeNB according to the relationship; or, the MME determines that the change of the CSG identity state corresponds to the SeNB via a CSG check request message; or, the MME determines that the change of the CSG identity state corresponds to the SeNB by means of other default or implementation modes.

Optionally, the UE context modification request message further contains the CSG ID corresponding to the updated CSG identity state information about the UE.

Step 1203: The SeNB updates the identity state of the UE, correspondingly adjusts the QoS level of the UE, and sends a UE context modification response message to the MME.

Step 1204: The SeNB sends an SeNB modification requirement message to the MeNB.

Herein, the SeNB modification requirement message contains the updated CSG identity state information about the UE or indication information (such as a reason value) for indicating update of the CSG identity state. In addition, the SeNB modification requirement message may be further configured for establishment request or release of bearers of the UE. For instance, if the identity of the UE in an SeNB cell is changed from a member to a non-member or the membership of the UE expires, the SeNB may release some bearers of the UE at the SeNB by means of the SeNB modification requirement message. When the identity of the UE in the SeNB cell is changed from a non-member to a member, the SeNB may trigger establishment of the bearers at the MeNB by means of the SeNB modification requirement message, and some bearers of the UE at the MeNB are distributed to the SeNB. In this case, the SeNB modification requirement message may further contain GTP-U information for data forwarding between the MeNB and the SeNB. Here, the SeNB modification requirement message may further contain QoS related parameters, such as a UE-AMBR value, adjusted by the SeNB according to the updated CSG identity state information about the UE. It is noted that Step 1204 may be performed before or after Step 1203.

Step 1205: If the MeNB determines to execute bearer release on the SeNB and needs to perform data forwarding, an SeNB modification request message is sent to the SeNB, the SeNB modification request message containing GTP-U information for data forwarding between the MeNB and the SeNB; and if the MeNB determines to execute bearer establishment on the SeNB, the MME sends an SeNB modification request message to the SeNB, the SeNB modification request message containing bearer information needing to be established, wherein the SeNB modification request message may contain QoS related parameters, such as a UE-AMBR value, adjusted by the MeNB according to the updated CSG identity state of the UE.

Step 1206: The SeNB returns an SeNB modification request acknowledgment message to the MeNB. If the MeNB requests the SeNB to establish bearers, the SeNB also needs to execute corresponding receiving control, reserves and configures radio resources for the recently established bearers, and sends radio resource configuration information to the MeNB. Here, in the case of bearer establishment, the SeNB modification request acknowledgment message may further contain GTP-U information for data forwarding between the SeNB and the MeNB.

Step 1207: If change of UE air interface configuration information is involved, the MeNB sends an RRC connection reconfiguration message to the UE, indicating the UE to reconfigure an air interface.

Step 1208: After completing air interface reconfiguration, the UE returns an RRC reconfiguration completion message to the MeNB.

Step 1209: The MeNB sends an SeNB reconfiguration completion message to the SeNB so as to indicate that a new radio air interface is successfully configured.

Step 1210: If a new bearer is established or released on the SeNB, a data forwarding process may be executed between the MeNB and the SeNB.

Step 1211: If a new bearer is established or released on the SeNB and a dual-connection user plane architecture 1A is adopted, the MeNB initiates a user plane path update process to the MME, so as to update S1-U user plane paths of some bearers on an SGW. It is noted that the user plane path update process may be initiated by the SeNB instead of the MeNB.

Embodiment 3

Figure 13:
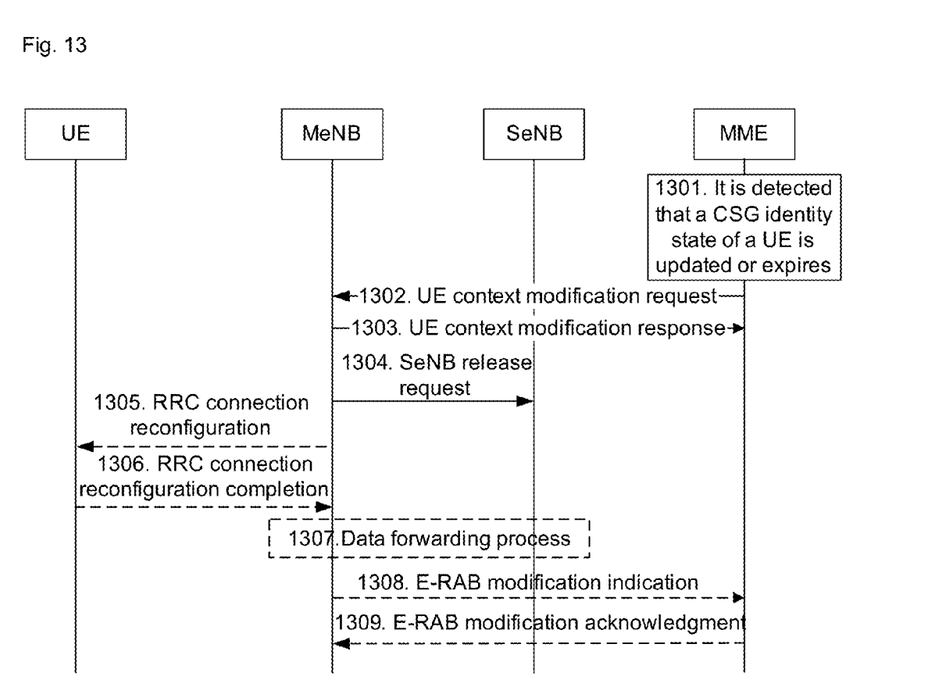
FIG. 13 is a flowchart showing a method for updating a CSG identity state according to an embodiment 3 of the present disclosure.

The embodiment describes a method for informing an MeNB by an MME after a CSG identity state of a UE in a closed cell of an MeNB is changed. FIG. 13 is a flowchart showing the method according to the embodiment. As shown in FIG. 13, the method of the embodiment includes the steps as follows.

Step 1301: An MME detects that a CSG identity state of a UE in a closed cell is changed, for instance, from a member/non-member to a non-member/member, or detects that a membership of the UE expires.

Step 1302: The MME sends a UE context modification request message, containing updated CSG identity state information about the UE, to an MeNB, Herein the UE context modification request message further contains a CSG ID corresponding to the updated CSG identity state information about the UE.

Step 1303: The MeNB sends a UE context modification response message to the MME.

In the step, the MeNB determines (according to, for instance, the CSG ID contained in the UE context modification request message) that the identity of the UE in the closed cell of the SeNB is changed from a member to a non-member according to the UE context modification request message, and sends the UE context modification response message to the MME. The UE context modification response message may further contain S1 release assistance information so as to assist the MME in determining whether it is necessary to execute an S1 release process for the UE. The S1 release assistance information at least includes one of:

(1) identification information about an eNB corresponding to an updated CSG identity state;

(2) indication information indicating that an eNB corresponding to an updated CSG identity state is an MeNB or an SeNB;

(3) indication information indicating that it is unnecessary to perform S1 release;

(4) indication information indicating that it is unnecessary to perform S1 release check; and (5) dual-connection indication information.

After the MME receives the S1 release assistance information, the following processing may be performed.

(1) If the MME receives the identification information about an eNB corresponding to an updated CSG identity state, the MME may determine whether the eNB corresponding to the updated CSG identity state is an MeNB or an SeNB according to locally stored information, if the eNB is the MeNB, it is determined that it is necessary to perform S1 release, and if the eNB is the SeNB, it is determined that it is unnecessary to perform S1 release.

(2) If the MME receives the indication information indicating that an eNB corresponding to updated CSG identity state information is an MeNB or an SeNB, when the indication information indicates that the eNB is the MeNB, it is determined that it is necessary to perform S1 release, and if the eNB is the SeNB, it is determined that it is unnecessary to perform S1 release.

(3) If the MME receives the indication information indicating that it is unnecessary to perform S1 release, it is determined that it is unnecessary to perform S1 release.

(4) If the MME receives the indication information indicating that it is unnecessary to perform S1 release check, it is unnecessary to determine whether to perform S1 release for the UE, and S1 release is not initiated.

(5) If the MME receives the dual-connection indication information, it is unnecessary to determine whether to perform S1 release for the UE, and S1 release is not initiated.

If the MME determines that it is necessary to perform S1 release, the MME monitors whether the UE is switched to other eNBs or whether S1 release has been completed. If not, after a timer with a specific duration expires, an S1 release flow is initiated.

If the MME determines that it is unnecessary to perform S1 release, an S1 release flow is not initiated. Optionally, the MME monitors whether the MeNB executes an SeNB release flow. For instance, under a dual-connection user plane architecture 1A, the MME may obtain whether SeNB release has been completed by means of a user plane path update process. Here, if the MME monitors that the MeNB does not perform SeNB release, the MME may initiate an S1 release process for the MeNB after a timer with a specific duration expires.

Step 1304: The MeNB determines whether to initiate a UE cell switching process or an S1 connection release process or an SeNB release process. Specifically, if the identity of the UE in a CSG cell of the MeNB is changed from a member to a non-member, it is necessary to initiate UE cell switching or S1 connection release. In the embodiment, if the identity of the UE in a CSG cell of the SeNB is changed from a member to a non-member, the MeNB sends an SeNB release request message to the SeNB. Optionally, the SeNB release requirement message contains the updated CSG identity state information about the UE or indication information (such as a reason value) for indicating update of the CSG identity state. It is noted that Step 1304 may be performed before or after Step 1303. If it is necessary to perform data forwarding between the SeNB and the MeNB, the SeNB release requirement message contains GTP-U information for data forwarding. After receiving the message, the SeNB releases radio resources relevant to the UE.

Step 1305: If change of UE air interface configuration information is involved, the MeNB sends an RRC connection reconfiguration message to the UE indicating the UE to reconfigure an air interface.

Step 1306: After completing air interface reconfiguration, the UE returns an RRC reconfiguration completion message to the MeNB.

Step 1307: If a bearer is released on the SeNB, a data forwarding process may be executed between the MeNB and the SeNB.

Step 1308: If a bearer is released on the SeNB and a dual-connection user plane architecture 1A is adopted, the MeNB initiates a user plane path update process to the MME, so as to update S1-U user plane paths of some bearers on an SGW. The MeNB may also carry the S1 release assistance information by means of a user plane path update request, the user plane path update request referring to, for instance, a path transfer request message or E-RAB modification indication information.

In addition, if the MME fails to receive the S1 release assistance information, the following processing may be performed.

(1) When the MME obtains that the UE adopts a dual-connection mode, S1 connection release check is not performed, and S1 connection release is not initiated.

(2) When the MME determines that only the SeNB is an HeNB, it is determined that it is unnecessary to perform S1 release. Here, the MME may monitor whether SeNB release is completely successfully.

(3) The MME maintains relationships between eNB IDs of the MeNB and the SeNB and between the eNB IDs and the CSG ID, or the MME obtains whether a CSG to which the UE has access belongs to the MeNB or the SeNB, and determines whether it is necessary to perform S1 release according to maintained information or obtained information.

Step 1309: The MME and the SGW interact so as to update S1-U paths of some bearers of the UE on the SGW, and return a user plane path update response, for instance, a path transfer request acknowledgment message or an E-RAB modification acknowledgment message, to the MeNB.

It is noted that if the MeNB is the HeNB and the identity of the UE in the closed cell of the MeNB is changed from a member to a non-member, the MeNB needs to switch the UE to other eNBs or to perform S1 connection release between the MeNB and the MME. Optionally, before a UE switching process or an S1 connection release process of the MeNB, the MeNB initiates an SeNB release process.

Embodiment 4

Figure 14:
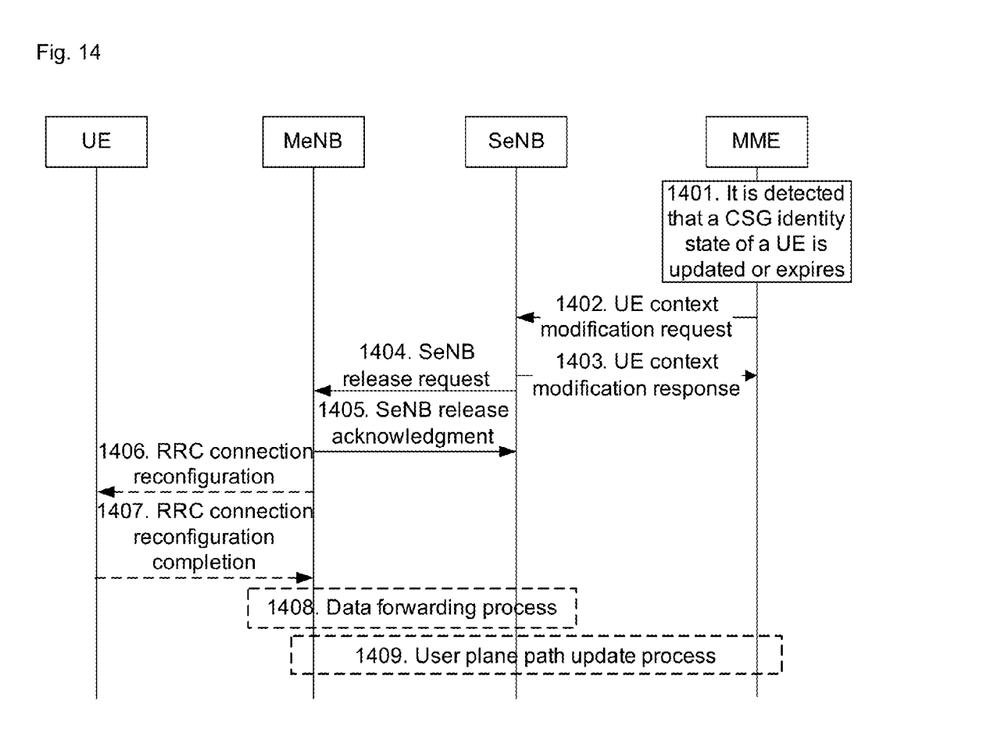
FIG. 14 is a flowchart showing a method for updating a CSG identity state according to an embodiment 4 of the present disclosure.

The embodiment describes a method for informing an SeNB by an MME after a CSG identity state of a UE in a closed cell of an SeNB is changed. FIG. 14 is a flowchart showing the method according to the embodiment. As shown in FIG. 14, the method of the embodiment includes the steps as follows.

Step 1401: An MME detects that a CSG identity state of a UE in a closed cell is changed, that is, from a member to a non-member, or detects that a membership of the UE expires.

Step 1402: Under the condition that both the MME and an MeNB/SeNB have UE related S1 connection, when determining that the change of the CSG identity state corresponds to the SeNB, the MME sends a UE context modification request message, containing updated CSG identity state of the UE, to the SeNB.

The MME determines that the change of the CSG identity state corresponds to the SeNB. For instance, a relationship between a CSG ID and an eNB ID is maintained at the MME, and the MME determines that the change of the CSG identity state corresponds to the SeNB according to the relationship; or, the MME obtains a relationship between the eNB ID and the MeNB/SeNB and determines that the change of the CSG identity state corresponds to the SeNB according to the relationship; or, the MME determines that the change of the CSG identity state corresponds to the SeNB by means of a CSG check request message; or, the MME determines that the change of the CSG identity state corresponds to the SeNB by means of other default or implementation modes.

Step 1403: The SeNB sends a UE context modification response message to the MME.

Here, under the condition that the change of the CSG identity state of the UE corresponds to the SeNB, S1 connection between the MeNB and the MME does not need to be released. Optionally, the MME may monitor whether the MeNB executes an SeNB release flow and whether S1 connection between the SeNB and the MME is released. For instance, under a dual-connection user plane architecture 1A, the MME may obtain whether SeNB release has been completed by means of a user plane path update process. Optionally, if the MME monitors that the MeNB does not perform SeNB release or S1 connection of the SeNB is not released, the MME may initiate an S1 release process for the MeNB or the SeNB after a timer with a specific duration expires.

Step 1604: The SeNB sends an SeNB release requirement message to the MeNB. Optionally, the SeNB release requirement message contains an updated CSG identity state of the UE or indication information (such as a reason value) for indicating update of the CSG identity state. It is noted that Step 1404 may be performed before or after Step 1403.

Step 1405: The MeNB returns an SeNB release acknowledgment message to the SeNB.

Here, if a bearer is released on the SeNB and it is necessary to perform data forwarding, the SeNB release acknowledgment message further contains GTP-U information for data forwarding between the MeNB and the SeNB.

Step 1406: If change of UE air interface configuration information is involved, the MeNB sends an RRC connection reconfiguration message to the UE indicating the UE to reconfigure an air interface.

Step 1407: After completing air interface reconfiguration, the UE returns an RRC reconfiguration completion message to the MeNB.

Step 1408: If a bearer is released on the SeNB, a data forwarding process may be executed between the MeNB and the SeNB.

Step 1409: If a bearer is released on the SeNB and a dual-connection user plane architecture 1A is adopted, the MeNB initiates a user plane path update process to the MME, so as to update S1-U user plane paths of some bearers on an SGW. It is noted that the user plane path update process may be initiated by the SeNB instead of the MeNB.

The above is only the preferred embodiments of the present disclosure, and is not used to limit the protection scope of the present disclosure. Any modifications, equivalent replacements, improvements or the like made within the spirit and principle of the present disclosure shall fall within the protection scope of the present disclosure.

INDUSTRIAL APPLICABILITY

In view of all the embodiments of the present disclosure, an eNB obtains updated CSG identity state information about a UE from an MME, causing update of a CSG identity state of the UE to be informed to the eNB in time, and enabling the eNB or the MME to correctly execute subsequent operations under a dual-connection architecture.

The invention claimed is:
1. A method for updating a Closed Subscriber Group (CSG) identity state, comprising:
obtaining, by an evolved Node B (eNB), updated CSG identity state information about a User Equipment (UE), and executing an update operation according to the updated CSG identity state information, the eNB being a Master eNB (MeNB) or a Secondary eNB (SeNB);

the method further comprising: when the eNB is the MeNB, sending, by the MeNB, the updated CSG identity state information or CSG identity state update indication information to the SeNB; and when the eNB is the SeNB, sending, by the SeNB, the updated CSG identity state information or CSG identity state update indication information to the MeNB, wherein sending, by the MeNB or the SeNB, the updated CSG identity state information or the CSG identity state update indication information to the SeNB or the MeNB comprises: sending, by the MeNB or the SeNB, the updated CSG identity state information or the CSG identity state update indication information by means of an SeNB modification flow or an SeNB release flow.

2. The method according to claim 1, wherein obtaining, by the eNB, the updated CSG identity state information about the UE comprises: obtaining, by the eNB, the updated CSG identity state information about the UE by means of a UE initial context establishment request message and/or a UE context modification request message, and wherein the CSG identity state information comprises a CSG identity state and/or a corresponding CSG ID.

3. The method according to claim 1, wherein when the eNB is the MeNB, executing the update operation according to the updated CSG identity state information comprises:
initiating, by the MeNB, an SeNB modification flow according to the updated CSG identity state information;
or, initiating, by the MeNB, an SeNB release flow according to the updated CSG identity state information;
or, initiating, by the MeNB, a cell switching flow according to the updated CSG identity state information;
or, initiating, by the MeNB, an S1 release flow according to the updated CSG identity state information;
or, initiating, by the MeNB, an SeNB release and cell switching flow according to the updated CSG identity state information;
or, initiating, by the MeNB, an SeNB release and S1 release flow according to the updated CSG identity state information; and
wherein when the eNB is the SeNB, executing the update operation according to the updated CSG identity state information comprises:
initiating, by the SeNB, an SeNB modification flow according to the updated CSG identity state information;
or, initiating, by the SeNB, an SeNB release flow according to the updated CSG identity state information.

4. The method according to claim 1, further comprising: when the eNB is the MeNB, the MeNB sends S1 release assistance information to a Mobility Management Entity (MME), wherein the S1 release assistance information at least comprises one of:
identification information about an eNB corresponding to the updated CSG identity state information;
indication information indicating that an eNB corresponding to the updated CSG identity state information is an MeNB or an SeNB;
indication information indicating that it is unnecessary to perform S1 release;
indication information indicating that it is unnecessary to perform S1 release check; and
dual-connection indication information.

5. The method according to claim 4, wherein the MeNB sends the S1 release assistance information to the MME by means of an S1 interface message, the S1 interface message comprising:

a UE context modification response message;
or, an Evolved Radio Access Bearer (E-RAB) modification indication message;
or, a path transfer request message;
or, an additional S1 interface message.

6. A method for updating a Closed Subscriber Group (CSG) identity state, comprising:
sending, by a Mobility Management Entity (MME), updated CSG identity state information about a User Equipment (UE) to an evolved Node B (eNB), the eNB being a Master eNB (MeNB) or a Secondary eNB (SeNB); and
obtaining, by the eNB, the updated CSG identity state information about the UE, and executing an update operation according to the updated CSG identity state information;
the method further comprising: when the eNB is the MeNB, sending, by the MeNB, the updated CSG identity state information or CSG identity state update indication information to the SeNB; and when the eNB is the SeNB, sending, by the SeNB, the updated CSG identity state information or CSG identity state update indication information to the MeNB,
wherein sending, by the MeNB or the SeNB, the updated CSG identity state information or the CSG identity state update indication information to the SeNB or the MeNB comprises: sending, by the MeNB or the SeNB, the updated CSG identity state information or the CSG identity state update indication information by means of an SeNB modification flow or an SeNB release flow.

7. The method according to claim 6, wherein sending, by the MME, the updated CSG identity state information about the UE to the eNB comprises: sending, by the MME, a UE initial context establishment request message and/or a UE context modification request message to the eNB, and wherein the UE initial context establishment request message and/or the UE context modification request message comprises the updated CSG identity state information about the UE and the CSG identity state information comprises a CSG identity state and/or a corresponding CSG ID.

8. An evolved Node B (eNB), the eNB being a Master eNB (MeNB) or a Secondary eNB (SeNB), comprising: an acquisition module which is implemented by an SI interface of the eNB and an update module which is implemented by a memory of the eNB, wherein
the acquisition module is configured to obtain updated Closed Subscriber Group (CSG) identity state information about a User Equipment (UE); and
the update module is configured to execute an update operation according to the updated CSG identity state information;
wherein when the eNB is the MeNB, the update module is further configured to send the updated CSG identity state information or CSG identity state update indication information to the SeNB, and when the eNB is the SeNB, the update module is further configured to send the updated CSG identity state information or CSG identity state update indication information to the MeNB;
wherein the update module is configured to send the updated CSG identity state information or the CSG identity state update indication information by means of an SeNB modification flow or an SeNB release flow.

9. The eNB according to claim 8, wherein the acquisition module is configured to obtain the updated CSG identity state information about the UE by means of a UE initial context establishment request message and/or a UE context modification request message, the CSG identity state information comprising: a CSG identity state and/or a corresponding CSG ID.

10. The eNB according to claim 8, wherein when the eNB is the MeNB, the update module is configured to:
   initiate an SeNB modification flow according to the updated CSG identity state information;
   or, initiate an SeNB release flow according to the updated CSG identity state information;
   or, initiate a cell switching flow according to the updated CSG identity state information;
   or, initiate an S1 release flow according to the updated CSG identity state information;
   or, initiate an SeNB release and cell switching flow according to the updated CSG identity state information;
   or, initiate an SeNB release and S1 release flow according to the updated CSG identity state information; and
   wherein when the eNB is the SeNB, the update module is configured to: initiate an SeNB modification flow according to the updated CSG identity state information; or, initiate an SeNB release flow according to the updated CSG identity state information.

11. The eNB according to claim 8, wherein when the eNB is the MeNB, the update module is further configured to send S1 release assistance information to a Mobility Management Entity (MME), wherein the S1 release assistance information at least comprises one of:
   identification information about an eNB corresponding to the updated CSG identity state information;
   indication information indicating that an eNB corresponding to the updated CSG identity state information is an MeNB or an SeNB;
   indication information indicating that it is unnecessary to perform S1 release;
   indication information indicating that it is unnecessary to perform S1 release check; and
   dual-connection indication information,
   wherein the update module is configured to send the S1 release assistance information to the MME by means of an S1 interface message, the S1 interface message comprising:
   a UE context modification response message;
   or, an Evolved Radio Access Bearer (E-RAB) modification indication message;
   or, a path transfer request message;
   or, an additional S1 interface message.

12. A system for updating a Closed Subscriber Group (CSG) identity state, comprising: an evolved Node B (eNB) and a Mobility Management Entity (MME), wherein the eNB is a Master eNB (MeNB) or a Secondary eNB (SeNB);
   the MME is configured to send updated CSG identity state information about a User Equipment (UE) to the eNB; and
   the eNB is configured to obtain the updated CSG identity state information about the UE, and execute an update operation according to the updated CSG identity state information;
   wherein when the eNB is the MeNB, the MeNB is further configured to send the updated CSG identity state information or CSG identity state update indication information to the SeNB, and wherein when the eNB is the SeNB, the SeNB is further configured to send the updated CSG identity state information or CSG identity state update indication information to the MeNB;
   wherein the MeNB or the SeNB is further configured to send the updated CSG identity state information or the CSG identity state update indication information by means of an SeNB modification flow or an SeNB release flow.

13. The system according to claim 12, wherein the MME is configured to send a UE initial context establishment request message and/or a UE context modification request message to the eNB, and wherein the UE initial context establishment request message and/or the UE context modification request message comprises the updated CSG identity state information about the UE and the CSG identity state information comprises a CSG identity state and/or a corresponding CSG ID.

14. The system according to claim 12, wherein when the eNB is the MeNB, the MeNB is configured to:
   initiate an SeNB modification flow according to the updated CSG identity state information;
   or, initiate an SeNB release flow according to the updated CSG identity state information;
   or, initiate a cell switching flow according to the updated CSG identity state information;
   or, initiate an S1 release flow according to the updated CSG identity state information;
   or, initiate an SeNB release and cell switching flow according to the updated CSG identity state information;
   or, initiate an SeNB release and S1 release flow according to the updated CSG identity state information; and
   wherein when the eNB is the SeNB, the SeNB is configured to: initiate an SeNB modification flow according to the updated CSG identity state information; or, initiate an SeNB release flow according to the updated CSG identity state information.

15. The system according to claim 12, wherein when the eNB is the MeNB, the MeNB is further configured to send S1 release assistance information to the MME, and wherein the S1 release assistance information at least comprises one of:
   identification information about an eNB corresponding to the updated CSG identity state information;
   indication information indicating that an eNB corresponding to the updated CSG identity state information is an MeNB or an SeNB;
   indication information indicating that it is unnecessary to perform S1 release;
   indication information indicating that it is unnecessary to perform S1 release check; and
   dual-connection indication information,
   wherein the MeNB is configured to send the S1 release assistance information to the MME by means of an S1 interface message, the S1 interface message comprising:
   a UE context modification response message;
   or, an Evolved Radio Access Bearer (E-RAB) modification indication message;
   or, a path transfer request message;
   or, an additional S1 interface message.

16. The system according to claim 15, wherein the MME is further configured to: determine whether to initiate the S1 release flow according to the updated CSG identity state of the UE and the S1 release assistance information; or, determine whether to initiate the S1 release flow according to the updated CSG identity state of the UE.

* * * * *